June 7, 1949.　　E. M. McELHINNEY ET AL　　2,472,223
LOADER MACHINE
Filed Dec. 13, 1946　　3 Sheets-Sheet 1
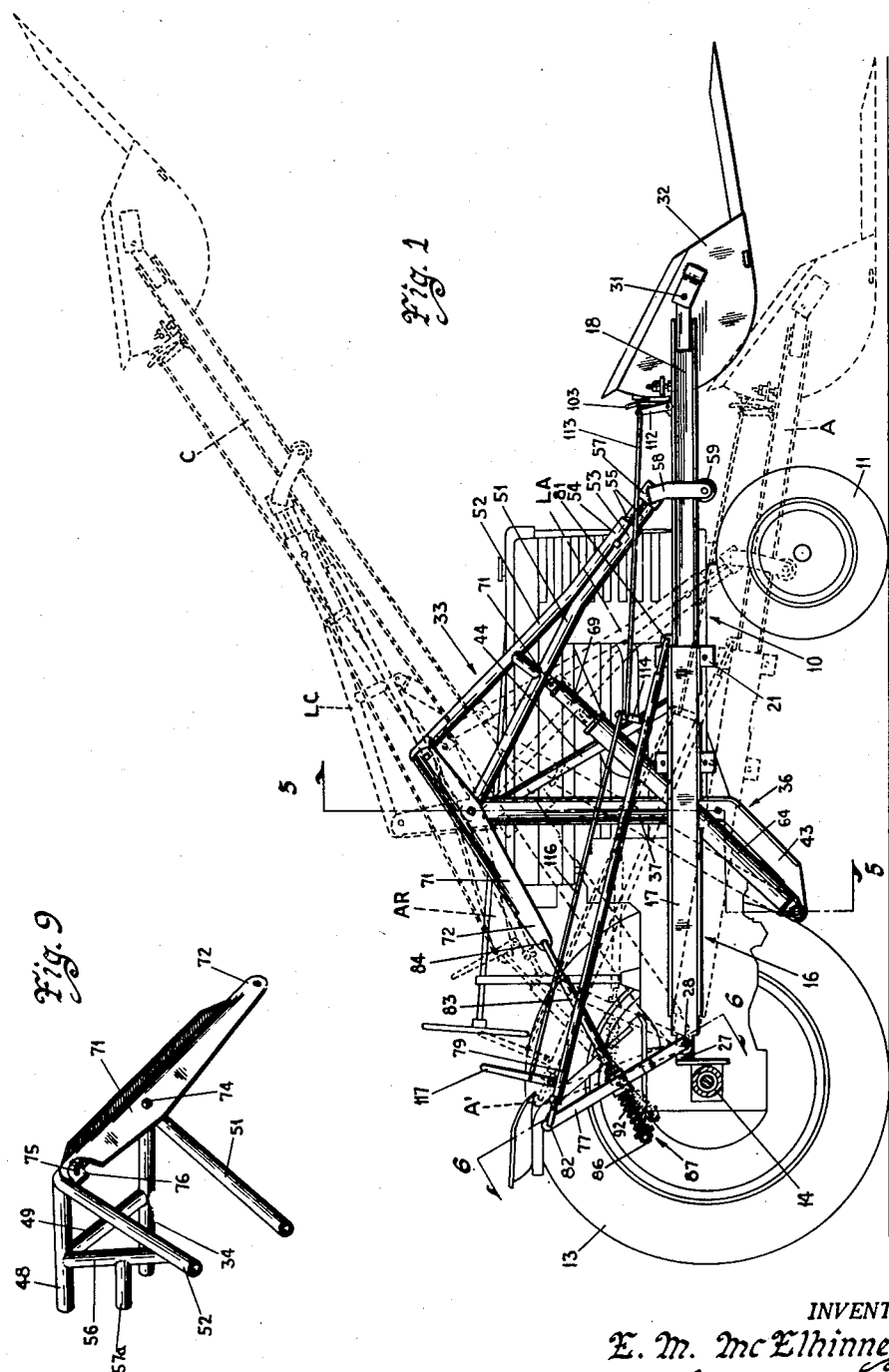
INVENTOR.
E. M. McElhinney
T. K. Podhajsky
By Rudolph L. Lowell Attorney

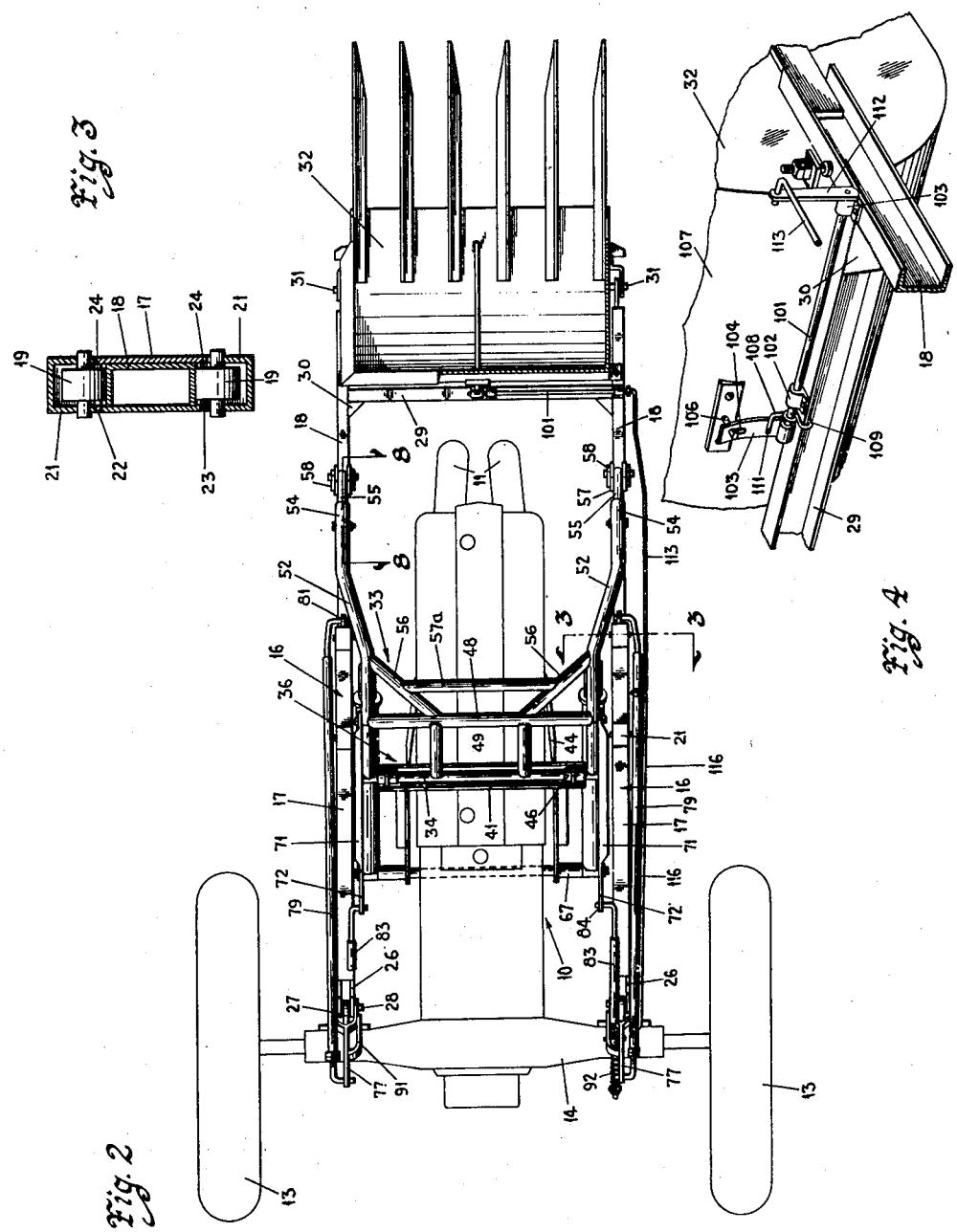

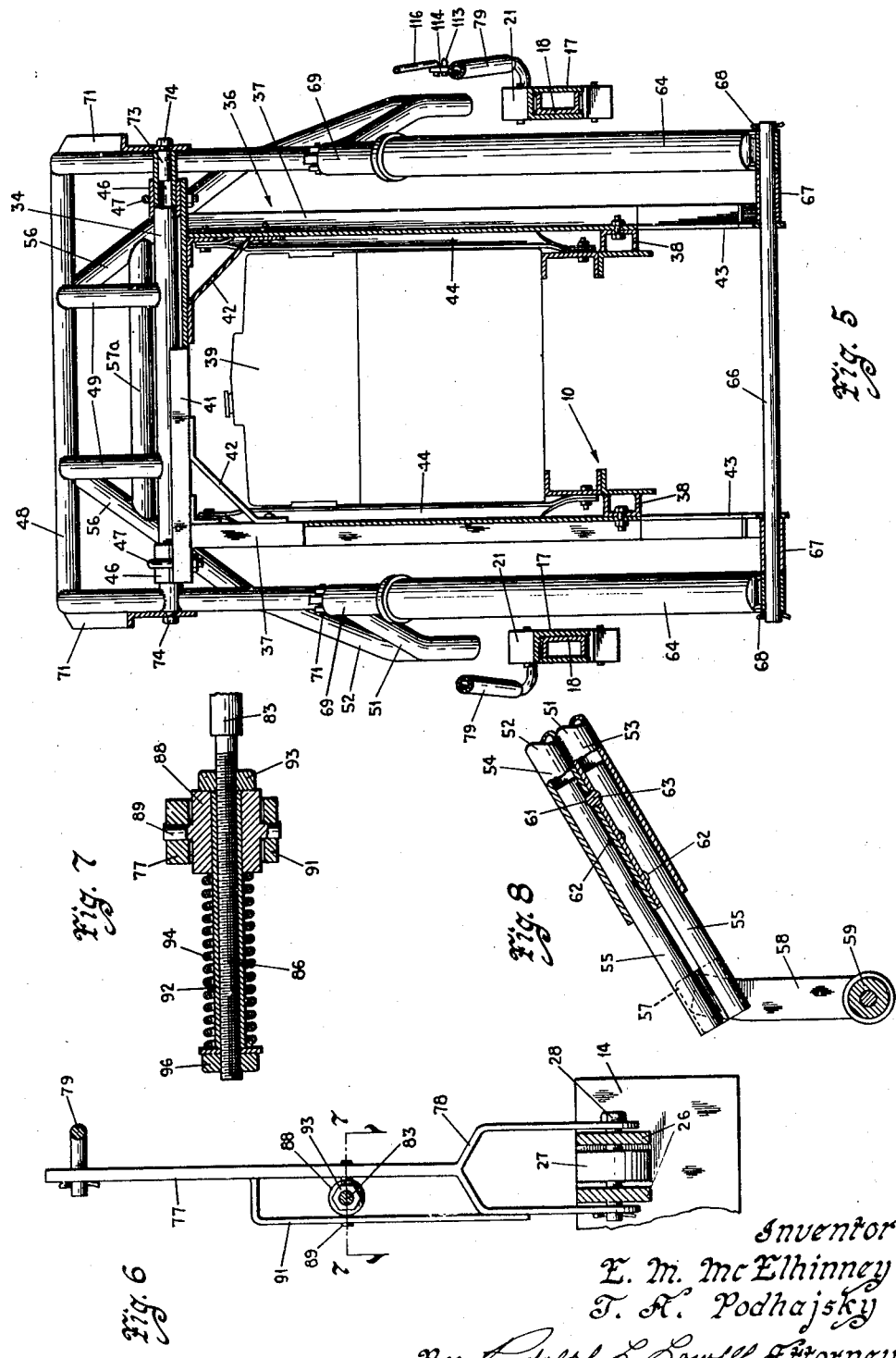

Patented June 7, 1949

2,472,223

UNITED STATES PATENT OFFICE 2,472,223

LOADER MACHINE

Eric M. McElhinney, Dysart, and Theodore A. Podhajsky, Traer, Iowa

Application December 13, 1946, Serial No. 716,132

8 Claims. (Cl. 214—141)

REISSUED
MAR 4 1952
RE 23466

This invention relates generally to loader machines and in particular to a loader attachment for a usual type farm tractor capable of handling manure, hay, dirt and the like.

An object of this invention is to provide an improved loader machine.

Another object of this invention is to provide a tractor loader attachment which affords full visibility to the tractor operator and is capable of elevating and positively holding a load in a carrying position closely adjacent to the front end of the tractor, and then moving the load upwardly and forwardly of the tractor to a load dumping position.

A further object of this invention is to provide a loader attachment for a tractor having pivoted telescoping booms, in which the booms are supported adjacent their load carrying ends at all elevated and extended positions thereof.

Another object of this invention is to provide a loader attachment for a tractor in which a pair of pivoted booms having a load carrying unit at their free ends, are supported at all elevated positions against movement sidewise or laterally of the tractor.

Still a further object of this invention is to provide a loader attachment for a tractor which is of a construction such that the weight of the attachment and any load carried thereby is applied on the tractor frame intermediate the front and rear wheels therefor.

Another object of this invention is to provide a loader attachment for a tractor which is of a compact and rugged construction, efficient in operation to transport loads and then dump such loads into a truck or wagon, and adapted to provide for a complete maneuverability of the tractor both when empty and loaded.

A feature of this invention is found in the provision of a loading attachment for a tractor in which a pair of pivoted telescoping booms are arranged at opposite sides of the tractor and provided with front telescoping members. A lift frame pivoted for up and down pivotal movement on an upright transverse frame, mounted on the tractor rearwardly of its front wheels, has a pair of forwardly extended lift members which are in a movable supporting engagement at their front ends with the telescoping members. The lift frame is pivoted by tractor operated means to raise and lower the lift members, and includes a pair of rearwardly extended levers or arms which are connected with the telescoping members through a lever system adapted to move the telescoping members in response to a pivotal movement of the lift frame.

Another feature of this invention is found in the provision of a tractor loader attachment having a pair of telescoping booms arranged at opposite sides of the tractor, and pivoted at their rear ends on the tractor, in which a load carrying unit is mounted between the front ends of telescoping members supported on the forward ends of the booms. The booms are raised and lowered by means including a pivoted lift frame, pivotally supported at its rear end at a position above and forwardly from the pivots for the boom and pivotally moved by tractor operated means. A pair of forwardly extended lift members on the pivoted frame movably engage and support the telescoping members, which are moved in response to a pivotal movement of the lift frame by means including a pair of rearwardly extended rock arms on the lifting frame, a pair of upright levers pivoted at their lower ends on the boom pivots, and links connected between the rock arms and upright levers, and between the upright levers and the telescoping members. The rock arms and upright levers are relatively arranged so as to be in planes substantially normal to each other when the booms are in a substantially horizontal position so that the telescoping members are in contracted positions during movement of the booms between horizontal and lowermost positions therefor.

A further feature of this invention is found in the provision of a tractor loader attachment in which a pair of pivoted booms, with a load carrying unit between their front ends, are raised and lowered by a pivoted lift frame assembled relative to the booms and to a pair of hydraulic cylinders arranged at opposite sides of the tractor such that a high elevation of the booms is accomplished with a minimum of movement for the lift pistons in the hydraulic cylinders.

Further objects, features and advantages of this invention will become apparent from the following description when taken in connection with the accompanying drawings, in which:

Fig. 1 is a side elevational view of the tractor loader attachment of this invention in assembly relation with a usual farm tractor, with certain parts being removed to more clearly show such assembly;

Fig. 2 is a plan view of the assembly shown in Fig. 1, with certain parts broken away for the purpose of clarity;

Fig. 3 is an enlarged sectional detail view taken on the line 3—3 of Fig. 2;

Fig. 4 is a fragmentary perspective view of the scoop-latching mechanism;

Figs. 5 and 6 are enlarged sectional detail views as seen along the lines 5—5 and 6—6, respectively, in Fig. 1, with certain parts being broken away in Fig. 5;

Fig. 7 is an enlarged sectional detail view taken on the line 7—7 in Fig. 6;

Fig. 8 is an enlarged sectional detail view taken on the line 8—8 in Fig. 2; and Fig. 9 is a fragmentary detail perspective view, with parts broken away, of a portion of a pivoted lifting frame which forms part of the loader attachment of this invention.

With reference to the drawings, the loader attachment of this invention is illustrated in Figs. 1 and 2 in assembly relation with a usual type farm tractor having a frame 10, steering wheels 11 and traction wheels 13 mounted on a rear axle 14.

The attachment includes a pair of pivoted telescoping booms 16 having rear members 17 of a box shape in cross section and front members 18 of a channel construction adapted for telescopic assembly within the rear members 17 (Figs. 2 and 3). The telescoping members 18 are movably supported for movement longitudinally of the rear members 17 by means including pairs of rollers 19 rotatably supported in brackets 21 secured as by welding to the top and bottom walls or sections 22 and 23, respectively, of the rear members 17. The walls 22 and 23 are cut away, as indicated at 24, to receive the rollers 19 therethrough for riding engagement with the top and bottom sides of the front telescoping members 18.

The booms 16 are arranged at opposite sides of the tractor frame 10 and are pivoted at their rear ends on the tractor rear axle 14 (Figs. 3 and 6) by the provision of a pair of transversely spaced lugs 26 projected rearwardly from the boom members 17 and adapted to receive therebetween a forwardly extended lug 27 mounted on the rear axle 14. Pivot bolts 28 inserted within aligned openings formed in the lugs 26 and 27 pivotally support the booms 16 for up and down pivotal movement.

The forward ends of the booms 16 are connected together by a transverse member 29 of a channel construction (Figs. 2 and 4) which is welded at its opposite ends to the telescoping members 18. Suitable brace members 30 of a plate form are welded between the transverse channel member 29 and the telescoping members 18. Pivotally supported at 31 (Figs. 1 and 2) between the front ends of the telescoping members 18 and forwardly of the transverse connecting member 29 is a scoop or load carrying unit 32.

The booms 16 are raised and lowered by means including a lift frame, designated generally as 33 (Figs. 1 and 2) of a substantially inverted U-shape and transversely arranged in a straddling relation with the tractor frame 10. The lift frame 33 is of a pipe construction and has a transverse pipe shaft 34 pivotally supported on the top of an upright transverse frame, indicated at 36, mounted on the tractor frame 10.

The upright frame 36 is located forwardly of the tractor rear axle 14 and includes a pair of upright side frame members 37 of a channel construction (Fig. 5) which are mounted opposite each other on bracket members 38 welded on the tractor frame 10. The side frame members 37 extend upwardly above the top level of the tractor engine hood or cowl 39, and are connected across their upper ends by a transverse channel member 41 which is faced upwardly. Brace members 42 are connected between the side frame members 37 and the top transverse frame member 41.

The lower ends of the side frame members 37 terminate in rearwardly and downwardly extended projections 43 (Fig. 1) for a purpose to be explained later. The upright frame 36 is supported against tipping movement by brace members 44 connected between the tractor frame 10 and the side frame members 37.

The pipe shaft 34 of the lift frame 36, is rotatably supported within the upturned top transverse channel member 41 in bearings 46 (Fig. 5) located at opposite ends of the channel 41 and secured to the channel by U-clamps 47. The pipe shaft constitutes part of a transverse frame structure in the lift frame 36 which includes a second transverse pipe member 48 (Figs. 2 and 5) arranged forwardly of and in a spaced parallel relation with the pipe shaft 34. These two transverse pipe members 34 and 48 are connected together by braces 49 of a pipe construction.

Projected forwardly from opposite ends of the two transverse pipe members 34 and 48 are pipe members 51 and 52, respectively (Figs. 1 and 2), which are bent outwardly and then forwardly such that their front ends 53 and 54, respectively, are arranged side by side in a superposed parallel relation to provide for their being welded together. Brace members 56 are connected between the top pipe members 52 and the transverse pipe member 48. The brace members 56 in turn are connected together by a transverse pipe member 57a.

A pair of rods 55 (Figs. 1 and 8) are insertable to adjusted positions within the front ends of the pipe members 51 and 52 and are connected together at their forward ends by plate members 57. Extended downwardly and forwardly from each plate member 57 is a pair of transversely spaced arms 58, of a flat bar construction, having rollers 59 rotatably supported between their lower ends. As best appears in Figs. 1 and 2, the front telescoping members 18 of the booms 16 extend between the arms 58 in supported positions on the rollers 59.

In order to adjust the rods 55 longitudinally of the pipe members 51 and 52, a circular opening 61 (Fig. 8) is formed between the adjacent sides of the pipe members 51 and 52 rearwardly from their front ends. The adjacent inner sides of the rods 55 are formed with a series of oppositely arranged axially spaced notches 62 of a semicircular shape corresponding in size to the opening 61. When a pair of opposite notches 62 are positioned in alignment with the opening 61 a bolt 63 inserted therethrough holds the rods 55 in adjusted positions against axial movement relative to the pipe members 51 and 52.

On pivotal movement of the lift frame 33 the booms 16 are lowered and raised by virtue of their movable support on the rollers 59 at the front ends of the pipe members 51 and 52. It is seen, therefore, that each associated pair of pipe members 51 and 52 constitute a lift arm formed as part of the lift frame 33.

Pivotal movement of the lift frame 33 is accomplished by the provision of a pair of hydraulic cylinders 64 (Figs. 1, 2 and 5) arranged at opposite sides of the tractor frame and pivotally supported at their lower ends on a transverse shaft 66 supported at the lower or rear end of the extensions 43 of the upright side frame members 37. The cylinders 64 are maintained in a spaced relation outwardly from adjacent upright frame members 37 by collar or sleeve members 67 mounted on the shaft 66, which is held against axial movement by cotter keys 68 inserted through the ends thereof. The cylinders 64 are inclined upwardly and forwardly and are provided with lift pistons 69 which are pivotally connected at 71 with the lower pipe members 52 of the lift arms. The forward inclination of the cylinders 64 is such that when the booms 16 are in their lowermost positions, the cylinders are substantially normal to the plane of the lift arms. Fluid under pressure is supplied to the cylinders 64 from a usual type oil pump unit (not shown) carried on the tractor and operated thereby.

The telescoping members 18 are extended and contracted in response to a pivotal movement of the lift frame 33 by the provision of means including a pair of longitudinally extended angle plate members 71 (Figs. 1 and 9) which have their front ends connected between the upper ends of the pipe members 51 and 52 of the lift arms, and their rear ends 72 projected rearwardly from the lift frame 33.

The rear ends 72 thus constitute rocker arms on the pipe member 34. Inserted within the ends of the pipe member 34 (Fig. 5) are plugs 73 which have tapped holes in their outer ends to receive bolts 74 extended through the plates 71. The pipe members 52 (Fig. 9) have lugs 76 on the rear sides of their top ends adapted to receive bolts 75 which are insertable through the front ends of the plate arms 71.

A pair of upright levers 77 (Figs. 2 and 6) have U-shaped lower ends 78 pivoted on the boom pivot bolts 28 and arranged in a straddling relation with the lugs 26. Forwardly and downwardly extended links 79 (Fig. 1) have their front ends pivotally connected at 81 with the telescoping members 18 and their rear ends pivotally connected at 82 with the upper ends of the upright levers 77. Upwardly and forwardly extended links 83 have their front ends pivotally connected at 84 with the free ends of the rock arms 72, and their rear ends 86 connected with the levers 77, intermediate their ends, by a lost motion means indicated generally as 87.

Since the construction and relative assembly of each lost motion means 87 with a corresponding upright lever 77 is the same, only one of such assemblies will be referred to in the following description. The lost motion means 87 includes a collar member 88 (Figs. 6 and 7) having oppositely arranged pivots 89 supported in the lever 77 and in a bracket member 91 secured to and spaced laterally from the inner side of the lever 77. Slidably inserted through the collar member 88 is a tubular sleeve member 92 which is mounted about the threaded rear end 86 of the link 83.

A first adjusting nut 93 is threadable on the rear end 86 of the link 83 forwardly of the collar 88 and the sleeve 92. A coil spring 94 is mounted about the sleeve 92 and maintained in compression against the rear side of the collar 88 by a second adjusting nut 96 threadable on the rear end 86 of the link 83 rearwardly of the sleeve 92. By relative adjustment of the nuts 93 and 96 the effective length of the link 83 between the upright lever 77 and a rock arm 72 is varied, and the lost motion of the link 83 in a rearward direction relative to the upright lever 77 is adjusted.

In the operation of the loader machine of this invention, assume that the booms 16 are in their lowermost positions as indicated in dotted lines at A in Fig. 1. At this position of the booms the pivoted connection 81 of the front ends of the links 79 are adjacent to the forward ends of the rear boom members 17, and the pivoted lift frame 33 is in a lowered position such that the lift arms, comprised of the members 51 and 52, are substantially normal to the hydraulic cylinders 64. On the application of fluid under pressure to the cylinders 64, to provide for an upward pivotal movement of the lift frame 33, the rollers 59 at the front ends of the lift arms are moved forwardly on the telescoping members 18 to initially elevate the booms 16 to their positions in a substantially horizontal plane, illustrated in full lines in Fig. 1.

During this initial upward movement of the booms 16 from their dotted line positions A to their horizontal full line positions, the upright levers 77 are pivotally moved rearwardly from their dotted line positions A' to their full line positions also illustrated in Fig. 1. This rearward pivotal movement of the levers 77 is accomplished by the downward pivotal movement of the rock arms 72 from their dotted line positions AR to their full line positions, illustrated in Fig. 1. The links 83, during this initial elevation of the booms 16, are maintained stationary by virtue of the action of the lost motion mechanism 87.

As a result the booms 16 are in contracted positions for their upward pivotal movement from their dotted line positions A to their full line positions, so that the scoop 32 at a load carrying position, as defined by the horizontal position of the booms 16, is maintained closely adjacent to the forward end of the tractor. As best appears in Fig. 1, a horizontal position of the booms 16 takes place when the rock arms 72 are in longitudinally aligned positions with the links 83, which aligned positions define the closest approach of the rear ends of the rock arms 72 to the upright levers 77 in the pivotal movement of the lift frame 33.

On a continued upward movement of the booms 16 from their full line positions to their dotted line positions, illustrated at C, the rock arms 72 move downwardly and forwardly in a pivotal path providing for a forward pivotal movement of the levers 77, which in turn act to move the links 79 in a forward direction. Due to the forward movement of the links 79 the telescoping members 18 are extended forwardly from the boom rear members 17 so that the booms are extended concurrently with their elevation from their full line positions to their dotted line positions C.

During this extension of the booms 16, the lift arms are pivotally moved forwardly and upwardly so that the movable support of the rollers 59 with the telescoping members 18 progresses in a direction forwardly of the booms 16. In other words, the rollers 59 are in supporting positions relative to the telescoping members 18 such that the rollers 59 are maintained substantially at the same distance rearwardly of the scoop 32 for all elevated positions of the booms 16. A rigid support of the scoop 32 for all elevated positions thereof is thus accomplished, so as to eliminate what may be termed a free-swinging load at the front ends of the booms 16.

Further, since the supporting arms 58, for the rollers 59, are disposed at opposite sides of the telescoping members 18, the booms 16 are maintained against swinging movement laterally of the tractor. Also, with the lift frame 33 pivoted on the upright frame 36 at a position intermediate the front wheels 11 and rear wheels 13 of the tractor, and with the support of the hydraulic cylinders 64 rearwardly of the upright frame 36, the complete weight of the loader attachment, and the weight of the load carried in the scoop 32, is distributed over the tractor in a manner to substantially reduce any overloading of the small tires for the front wheels 11.

Because of the pivotal connection of the pistons 69, for the cylinders 64, with the lift arms at positions intermediate the ends of the lift arms, only a small movement of the pistons is required to pivotally move the lift frame 33 from its dotted line position LA to its dotted line position LC, illustrated in Fig. 1. As a result the pistons 69 are in full bearing support with the cylinders 64 for all elevated positions of the booms 16.

The latch mechanism for releasably holding the scoop 32 in a load carrying position includes a rock shaft 101 (Fig. 4) rockably supported in bearings 102 and 103 mounted on the top of the transverse connecting member 29 and a telescoping member 18, respectively. An upright latch 103 mounted on the inner end of the rock shaft 101 has a slotted opening 104 adjacent to its free end which is adapted to receive in locking engagement a catch member 106 extended rearwardly from the back wall 107 of the scoop 32. The latch 103 is yieldably maintained in engagement with the catch 106 by a torsion spring 108 mounted on the rock shaft 101, which has one end 109 engageable with the connecting member 29 and its opposite end 111 engageable with the rear side of the latch 103.

An upright rock arm 112 mounted on the outer end of the rock shaft 101, has its free end pivotally connected with the front end of a link 113, the rear end of which is pivoted to an upright pivoted lever 114 pivotally supported on a link member 79 (Figs. 1 and 2). A second link 116 is pivotally connected between the upright lever 114 and a pivoted handle 117 carried on the link 79 adjacent to its rear end and at a position conveniently accessible to the tractor operator.

To dump the scoop 32, the handle 117 is pulled rearwardly whereby the latch 103 is moved rearwardly against the action of the spring 108 out of an engaged position with the catch 106. The scoop 32 is returned by gravity to its load carrying position by virtue of its assembly on the pivots 31 in a manner such that when empty its rear end overbalances the front end thereof.

From a consideration of the above description it is seen that the invention provides a loading machine which is of a simple and rugged construction, and capable of rigidly supporting a load at all elevated positions of the load.

The loader is adapted to initially lift a scoop to a load carrying position closely adjacent to the front end of the tractor, and then to move the load forwardly ahead of the tractor on a continued elevation of the load lifting arms. The attachment is relatively assembled with the tractor such that full visibility to the tractor operator and a complete maneuverability of the tractor is accomplished for all operating positions of the loader.

Although the invention has been described with respect to a preferred embodiment thereof, it is to be understood that it is not to be so limited since changes and modifications can be made therein which are within the full intended scope of this invention, as defined by the appended claims.

We claim:

1. A loading machine including a portable frame, a pair of pivoted telescoping booms arranged at opposite sides of said portable frame having telescoping front members, first means pivotally supporting the rear ends of said booms on said portable frame, a load carrying unit mounted between the front ends of said telescoping members, a pair of forwardly extended lift members, second means pivotally supporting the rear ends of said lift members on said portable frame at a position spaced forwardly and above said first supporting means, means at the front ends of said lift members for movably supporting said booms, rearwardly extended rock arms mounted on said second supporting means for movement with said lift members, means for raising and lowering said lift members, means for moving said telescoping members in response to a pivotal movement of said lift members including upright levers on said first supporting means, first links connected between said upright levers and the free ends of said rock arms, and second links connected between said upright levers and said telescoping front members.

2. A loading machine including a portable frame, a pair of pivoted telescoping booms arranged at opposite sides of said frame having front telescoping members, means pivoting the rear ends of said booms on said frame, a load carrying unit mounted between the forward ends of said telescoping members, an upright transverse frame on said portable frame located forwardly of the rear ends of said booms, a pair of lift members pivotally supported at their rear ends on said upright frame and having their front ends in a movable and supporting engagement with said telescoping members, rearwardly projected extensions on said lift members, means for pivotally moving said lift members to raise and lower said booms, means for moving said telescoping members in response to a pivotal movement of said lift members including a pair of upright levers pivoted on the pivot means for the rear ends of said booms, first link members movably connected between said upright levers and the rear ends of said extensions, and second link members movably connected between said upright levers and said telescoping members.

3. A loading machine including a portable frame, a pair of pivoted telescoping booms arranged at opposite sides of said frame, telescoping members at the front ends of said booms, means pivoting the rear ends of said booms on said portable frame, a load carrying unit mounted between the front ends of said telescoping members, an upright frame on said portable frame arranged forwardly of said pivot means, a lift frame rockably supported on said upright frame for up and down pivotal movement including a pair of forwardly extended lift arms having their front ends adapted to movably engage and support said telescoping members, means for rocking said lift frame to raise and lower said lift arms, means for moving said telescoping members in response to a pivotal movement of said lift frame including rearward extensions on said lift arms arranged so as to be in a substantially horizontal plane when said lift arms are in their lowermost positions, upright levers pivoted at their lower ends on said pivot means, first links pivotally connected with the rear ends of said extensions and with said levers intermediate the ends of said levers, and second links pivotally connected between said telescoping members and the upper ends of said upright levers.

4. A loading machine including a portable frame, a pair of pivoted booms arranged at opposite sides of said portable frame, means pivoting the rear ends of said booms on said portable frame, telescoping members at the forward ends of said booms, a load carrying unit mounted between the front ends of said telescoping members, an upright transverse frame on said portable frame located forwardly of said pivot means, a pair of pivoted lift arms having their rear ends pivotally support on said upright frame and their front ends adapted to movably engage and support said telescoping members, means for pivotally moving said lift arms to raise and lower said booms, means for moving said telescoping members in response to a pivotal movement of said lift arms including rearwardly projected extensions on said lift arms, a pair of upright levers having their lower ends pivoted on said pivot means, rod members connected between said telescoping members and the upper ends of said upright levers, and lost motion means connected between the rear ends of said extensions and said upright levers to provide for said extensions being substantially normal to said upright levers when said booms are in a substantially horizontal position.

5. A loader machine including a portable frame, a pair of pivoted telescoping booms arranged at opposite sides of said portable frame, means pivoting the rear ends of said booms on said portable frame, telescoping members at the front ends of said booms, an upright transverse frame on said portable frame arranged forwardly of said pivot means, a pivoted lift frame pivotally supported at its rear end on said upright frame and having oppositely arranged forwardly extended lift arms, means at the front ends of said lift arms for movably engaging and supporting said telescoping members, means for pivoting said lift frame to raise and lower said lift arms including a pair of upwardly and forwardly inclined hydraulic cylinders, means arranged below and rearwardly of said upright frame for pivotally supporting the lower ends of said cylinders, pistons for said cylinders having their upper ends movably connected with said lift arms intermediate the ends thereof, means for supplying fluid under pressure to said cylinders, and means responsive in operation to a pivotal movement of said lift frame to move said telescoping members.

6. A loading machine including a portable frame, a pair of pivoted telescoping booms arranged at opposite sides of said frame and pivoted at their rear ends on said frame, telescoping members at the forward ends of said booms, a load carrying unit mounted between the front ends of said telescoping members, an upright transverse frame carried on said portable frame, a pivoted lift frame pivotally supported on said upright frame and including a pair of forwardly extended lift arms, adjustable means supported on the front ends of said lift arms for movement longitudinally of said lift arms to adjusted positions, means on said adjustable means for movably engaging and supporting said telescoping members, means for pivoting said lift frame to raise and lower said booms, means for moving said telescoping members in response to a pivotal movement of said lift frame including rear extensions on said lift arms, upright levers having their lower ends pivoted on said portable frame adjacent to the rear ends of said booms, and link members movably connected with said upright levers and with said telescoping members and rear extensions.

7. A loading machine including a portable frame, a pair of pivoted telescoping booms arranged at opposite sides of said frame, telescoping members at the forward ends of said booms, a load carrying unit mounted between the front ends of said telescoping members, means for pivoting the rear ends of said booms on said portable frame, an upright transverse frame on said portable frame, a pair of transversely spaced lift members pivoted intermediate their ends on said upright frame, means at the front ends of said lift members for movably engaging and supporting said telescoping members, means for pivoting said lift members to raise and lower said booms, means for moving said telescoping members in response to a pivotal movement of said lift members including upright levers pivoted at their lower ends adjacent to the pivot means for said booms, first links connected between said upright levers and said telescoping members, and second links connected between said upright levers and the rear end portions of said lift members, with said rear end portions being adapted to be in longitudinal alignment with said second links when said booms are in substantially horizontal positions.

8. A loading machine including a portable frame, a pair of pivoted booms arranged at opposite sides of said portable frame and pivotally supported at the rear ends on said frame, front telescoping members for said booms, a load carrying unit mounted between said telescoping members, an upright frame on said portable frame located forwardly of the rear ends of said booms, a pair of forwardly extended lift members pivoted at their rear ends adjacent the top of said upright frame and having their front ends movable relative to said telescoping members and of a construction to support said telescoping members at any moved positions therefor, means for pivoting said lift members to raise and lower said booms, and means movably connected between said lift members and telescoping members to extend and contract said telescoping members in response to a pivotal movement of said lift members, with the front ends of said lift members being movable relative to said telescoping members during said extension and contraction thereof.

ERIC M. McELHINNEY.
THEODORE A. PODHAJSKY.

REFERENCES CITED

The following references are of record in the file of this patent:

UNITED STATES PATENTS

| Number | Name | Date |
| --- | --- | --- |
| 2,080,461 | Cope | May 18, 1937 |
| 2,126,791 | Low | Aug. 16, 1938 |
| 2,287,375 | Ford, Jr. | June 23, 1942 |
| 2,295,917 | Schwan | Sept. 15, 1942 |
| 2,404,820 | Wuertz et al. | July 30, 1946 |